United States Patent
Semaan et al.

(10) Patent No.: US 10,904,826 B2
(45) Date of Patent: Jan. 26, 2021

(54) METHODS AND SYSTEMS FOR AUTONOMOUS DEVICE SELECTION OF TRANSMISSION RESOURCES

(71) Applicant: Telefonaktiebolaget LM Ericsson (publ), Stockholm (SE)

(72) Inventors: Eliane Semaan, Sundbyberg (SE); Robert Baldemair, Solna (SE); Icaro L. J. da Silva, Solna (SE); Bengt Lindoff, Bjärred (SE); Johan Nilsson, Höllviken (SE); Andres Reial, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 133 days.

(21) Appl. No.: 15/524,351

(22) PCT Filed: Sep. 15, 2016

(86) PCT No.: PCT/SE2016/050866
§ 371 (c)(1),
(2) Date: May 4, 2017

(87) PCT Pub. No.: WO2018/052349
PCT Pub. Date: Mar. 22, 2018

(65) Prior Publication Data
US 2018/0242234 A1    Aug. 23, 2018

(51) Int. Cl.
*H04W 48/18*  (2009.01)
*H04W 72/04*  (2009.01)
(Continued)

(52) U.S. Cl.
CPC ....... *H04W 48/18* (2013.01); *H04W 72/0453* (2013.01); *H04W 16/14* (2013.01);
(Continued)

(58) Field of Classification Search
None
See application file for complete search history.

(56) References Cited

U.S. PATENT DOCUMENTS

| 8,787,512 B1 | 7/2014 | Ben-Ari et al. |
| 2008/0031222 A1 * | 2/2008 | Nanda ................ H04W 72/02 370/350 |

(Continued)

FOREIGN PATENT DOCUMENTS

KR  20170048144 A  *  8/2016

OTHER PUBLICATIONS

CMCC et al., "Deployment scenarios and use cases for Multi-RAT joint coordination", 3GPP TSG-RAN WG3 Meeting #83, Feb. 10-14, 2014, pp. 1-8, Prague, Czech Republic, R3-140073.

(Continued)

*Primary Examiner* — Andre Tacdiran
(74) *Attorney, Agent, or Firm* — Patent Portfolio Builders, PLLC

(57) ABSTRACT

A method and device for transmitting information in a telecommunication system are described. A device (UE) selects which one of two or more radio access technologies (RATs) or, which one of two or more frequency bands, to use for transmission of a data signal. The device transmits the data signal using the selected RAT or frequency band.

15 Claims, 6 Drawing Sheets

300

302
Selecting, by a device, which one of two or more radio access technologies (RATs) or which one of two or more frequency bands, to use for transmission of a data signal; and 304
Transmitting, by the device, the data signal using the selected RAT or frequency band.

(51) Int. Cl.
*H04W 74/08* (2009.01)
*H04W 16/14* (2009.01)
*H04W 72/02* (2009.01)
*H04W 72/14* (2009.01)

(52) U.S. Cl.
CPC ............ *H04W 72/02* (2013.01); *H04W 72/14* (2013.01); *H04W 74/0808* (2013.01)

(56) References Cited

U.S. PATENT DOCUMENTS

| | | | | |
|---|---|---|---|---|
| 2011/0021167 | A1* | 1/2011 | Shellhammer | H04B 17/26 455/226.1 |
| 2013/0143502 | A1* | 6/2013 | Kazmi | H04W 88/06 455/62 |
| 2014/0362780 | A1* | 12/2014 | Malladi | H04L 27/0006 370/329 |
| 2016/0128128 | A1* | 5/2016 | Ang | H04W 52/0222 370/311 |
| 2016/0143014 | A1* | 5/2016 | Mukherjee | H04L 5/0039 370/330 |
| 2016/0205703 | A1* | 7/2016 | Dudda | H04W 76/38 455/452.1 |
| 2016/0219477 | A1* | 7/2016 | Bergstrom | H04W 36/14 |
| 2016/0219487 | A1* | 7/2016 | Khawer | H04W 36/36 |
| 2016/0227558 | A1 | 8/2016 | Jain | |
| 2016/0269945 | A1* | 9/2016 | Jang | H04W 72/0453 |
| 2016/0309354 | A1* | 10/2016 | Yerramalli | H04W 72/085 |
| 2016/0309463 | A1* | 10/2016 | Khawer | H04W 72/0446 |
| 2016/0330641 | A1* | 11/2016 | Zhang | H04W 36/0085 |
| 2017/0118766 | A1* | 4/2017 | Baek | H04W 72/1268 |
| 2017/0273109 | A1* | 9/2017 | Babaei | H04W 74/0808 |
| 2017/0289898 | A1* | 10/2017 | Youn | H04W 48/14 |
| 2018/0063863 | A1* | 3/2018 | Liu | H04W 72/1278 |
| 2018/0139701 | A1* | 5/2018 | Wang | H04W 52/367 |
| 2018/0192365 | A1* | 7/2018 | Feng | H04B 17/309 |
| 2018/0235007 | A1* | 8/2018 | Gou | H04L 27/0006 |
| 2018/0249374 | A1* | 8/2018 | Park | H04J 11/00 |
| 2018/0255576 | A1* | 9/2018 | Bhorkar | H04W 74/0808 |
| 2018/0255578 | A1* | 9/2018 | Kim | H04W 74/0833 |
| 2018/0270038 | A1* | 9/2018 | Oteri | H04L 5/0037 |
| 2018/0279366 | A1* | 9/2018 | Harada | H04W 72/121 |
| 2019/0045528 | A1* | 2/2019 | Xu | H04W 72/0446 |
| 2019/0053265 | A1* | 2/2019 | Kim | H04W 72/1284 |
| 2019/0069328 | A1* | 2/2019 | Sharma | H04W 76/10 |
| 2019/0082436 | A1* | 3/2019 | Huang | H04W 16/32 |
| 2019/0141728 | A1* | 5/2019 | Takeda | H04W 74/08 |
| 2019/0200349 | A1* | 6/2019 | Harada | H04W 72/0413 |
| 2019/0200386 | A1* | 6/2019 | Yang | H04W 74/08 |
| 2019/0313432 | A1* | 10/2019 | Belghoul | H04L 5/001 |

OTHER PUBLICATIONS

Samsung, "Discussion on DL power allocation for LAA", 3GPP TSG RAN WG1 #81, May 25-29, 2015, pp. 1-3, Fukuoka, Japan, R1-152870.

Interdigital Communications, "Supporting NR in unlicensed spectrum", 3GPP TSG-RAN WG2 Meeting #95, Aug. 22-26, 2016, pp. 1-3, Gothenburg, Sweden, R2-165052.

3RD Generation Partnership Project, "Technical Specification Group Services and System Aspects; Feasibility Study on New Services and Markets Technology Enablers; Stage 1 (Release 14)", 3GPP TR 22.891 V14.1.0, Jun. 2016, pp. 1-95.

* cited by examiner

METHODS AND SYSTEMS FOR AUTONOMOUS DEVICE SELECTION OF TRANSMISSION RESOURCES

TECHNICAL FIELD

The present invention generally relates to radiocommunications and more specifically, to radiocommunication systems, devices and methods which enable autonomous device selection of transmission resources.

BACKGROUND

Work is ongoing to establish requirements for, and then to standardize, next generation (5G) radiocommunication systems including a new radio access technology (referred to herein as "NR") which is seen as an evolution from the 4G radio access technology (LTE). So-called "tight integration" is a phrase used to convey technological concepts being developed to fulfill 5G user requirements, such as very high data rates by user plane aggregation or ultra-reliability by user or control plane diversity. User plane aggregation is particularly efficient if NR and LTE offer similar throughput for a particular user so that the aggregation can roughly double the throughput. The occurrence of these cases will depend on the allocated spectrum, the coverage and the load of the two accesses. Ultra-reliability can be mandatory for some critical applications for which reliability and low latency are crucial to maintain.

In addition to these developing radiocommunication aspects, tight integration also provides enhancements to existing multi-RAT features (such as load balancing and service continuity) due to a radio access network (RAN) level integration transparent to the core network (CN) (less signaling). Service continuity, in particular, will be important in early deployments since it can be expected that early NR deployments will consist of radio coverage "islands" within a wider, already-deployed LTE network coverage.

The network scenarios for deployment of LTE and NR may be very diverse in terms of coverage and co-location. In terms of deployments, LTE and NR can be co-located (site 100, FIG. 1(*a*)) or non co-located (site 160, FIG. 1(*b*). In terms of coverage, LTE and NR may have essentially the same coverage, e.g. in a situation where LTE and NR are deployed co-located and operating in a similar spectrum as shown graphically in FIG. 1(*a*) at block 102. Alternatively, for the co-located case of FIG. 1(*a*), NR may have better coverage (block 104) than LTE due to the usage of high gain beamforming or NR may be deployed in a high frequency band which would result in a spottier NR coverage (block 106). Looking at the non co-located case of FIG. 1(*b*), in some regions proximate the two access points (LTE and NR), there will be overlapping coverage from both the LTE system and the NR system (block 162), while in other regions, represented by blocks 164 and 166, respectively, there may only be NR coverage or only LTE coverage.

In addition to network scenarios which will occur as 5G technologies are introduced, there will also be scenarios which arise from the perspective of the user equipment (UE). Some of these UE scenarios are presented here as different UE types which may be limited with respect to the kind of tight integration solutions they support. For example, one characteristic of the different UE types is the number of receiver chains that they possess, i.e., the circuitry which processes the incoming radio signal into a stream of received data bits. It is expected that when 5G technologies are deployed, there will be UEs with dual radios, where each radio has both receiver and transmitter (RX/TX) chains which can be operated simultaneously. Such UEs will be able to be fully connected to both LTE radiocommunication systems and NR radiocommunication systems at the same time without requiring time division operation on lower layers (sometimes referred to herein as "dual connectivity" and illustrated in FIG. 2(*a*)).

From a specification point of view, tight integration will be easiest to specify for this dual connectivity UE type, in the following referred to also as UE type #1. However, from an implementation point of view, two transmitter chains (i.e., enabling the UE to transmit on multiple uplinks) operating simultaneously introduces new challenges, including the need to split the limited TX power across the two TXs as well as intermodulation problems which might prohibit dual UL TX in certain cases. Thus, there will also be UEs with dual RX but single TX, as these are easier to implement, and these are referred to as UE type #2 (shown in FIG. 2(*b*)). Finally, there will be single-radio low cost UEs capable of communicating over both air interfaces, but only one at a time, referred herein to as UE type #3 and shown in FIG. 2(*c*)).

In order for the evolving wireless communication systems to handle the envisioned growth in traffic volume, wider frequency bands, new spectrum, advanced antenna solutions and in some cases denser deployments are needed. In addition, a massive growth in the number of connected devices as well as an increasingly wide range of new applications are expected in order to enable a well-functioning networked society, where information can be accessed and data shared anywhere and anytime, by anyone and anything, e.g. as part of the Internet of Things (IoT).

Thus, in addition to new network and UE scenarios presented by 5G technology, there will also be new scenarios presented by the spectrum in which 5G will operate. The evolving 5G cellular wireless networks are envisioned to overcome the limitations of existing cellular networks by allowing for higher data rates, improved user experience, lower energy consumption and satisfying the ever-increasing traffic demand. For this purpose, the need for additional spectrum beyond what was previously allocated to existing standards is emerging. The use of high frequency bands, including licensed, unlicensed and licensed-shared spectrum is a potential candidate to overcome the problem of scarce spectrum resources by allowing for wider bandwidths, more advanced antenna arrays and massive beam-forming.

As of today, licensed spectrum is primarily used for wide area networks. The license costs are significant but, on the other hand, the licensed spectrum permits high transmission power, accurate cell planning and full frequency re-use without the need to apply co-existence schemes. This ensures good coverage even in areas of sparse deployments. The exclusive use of the licensed spectrum minimizes the risk of delay spikes and maximizes the capacity.

On the other hand, Wi-Fi, LTE License Assisted Access (LAA) and other emerging technologies, use unlicensed spectrum. Such technologies permit access to wide frequency bands given that a device must ensure fair access to the spectrum. In some bands this is typically achieved by coexistence mechanisms such as "Listen Before Talk" (LBT). Energy detection just before a planned transmission burst may reveal that the spectrum is already used by another device. Various back-off schemes are supposed to keep access delay short while making the spectrum sharing fair.

In order to provide sufficient spectrum for 5G technologies to fulfill design requirements, it may be necessary to use both licensed and unlicensed spectrum. This will present both UE and network scenarios regarding how to choose which spectrum to use for, e.g., uplink or sidelink communications.

SUMMARY

Embodiments enable devices, e.g., user equipments (UEs), to autonomously select transmission resources, i.e., one of a plurality of RATs and/or one of a plurality of frequency bands, for e.g., its uplink or sidelink transmissions. This reduces delays in performing k transmissions, particularly when the transmission resources include unlicensed spectrum that require clear channel assessment or carrier sensing using co-existence mechanisms.

According to an embodiment, a method for transmitting information in a telecommunication system includes selecting, by a device, which one of two or more radio access technologies (RATs) or, which one of two or more frequency bands, to use for transmission of a data signal; and transmitting, by the user equipment, the data signal using the selected RAT or frequency band.

According to an embodiment, a device includes a processor configured to select which one of: two or more radio access technologies (RATs) or which one of two or more frequency bands, to use for transmission of a data signal; and a transceiver configured to transmit the data signal using the selected RAT or frequency band.

According to another embodiment, a network node includes a transceiver for transmitting signals toward, and receiving signals from, a device over one or more air interfaces including two or more Radio Access Technologies (RATs) or two or more frequency bands; and a processor for processing a signal received from the device over a first RAT or a first frequency band and for determining whether the signal either implicitly or explicitly confirms a resource grant which had previously been transmitted to device on a second RAT or second frequency band.

According to an embodiment, an apparatus adapted to select, by a device, which one of two or more radio access technologies (RATs) or, which one of two or more frequency bands, to use for transmission of a data signal; and to transmit, by the device, the data signal using the selected RAT or frequency band.

According to an embodiment, an apparatus includes: a first module configured to select which one of two or more radio access technologies (RATs) or, which one of two or more frequency bands, to use for transmission of a data signal; and a second module configured to transmit the data signal using the selected RAT or frequency band.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1A:
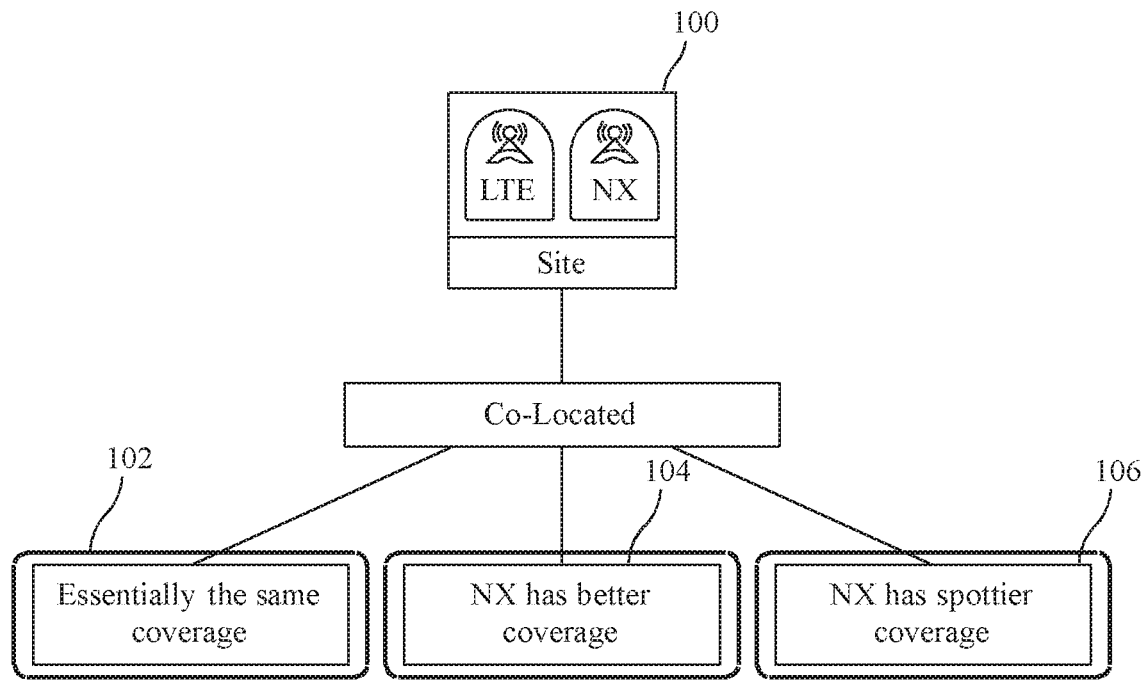
FIG. 1 illustrates various network scenarios associated with deployment of 5G radiocommunication systems.

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

As described in the Background, it is anticipated that next generation radiocommunication systems will employ both licensed and unlicensed spectrum. A known drawback of operating in unlicensed bands and applying LBT or other co-existence mechanisms is the increased probabilities that a UE's uplink transmission might be delayed due to an unsuccessful LBT check, i.e. showing that the channel is busy. This problem occurs when the target channel is found to be busy due to another ongoing transmission. However, it may also occur if the target channel is sensed to be busy while it is available (i.e. false busy detection). Nevertheless, unlicensed spectrum is suitable for several use cases and deployments and it may enable new use cases for which licensed spectrum is not applicable or not available. In this context, licensed spectrum refers to, for example, a frequency band or bands for which a government agency has given one or more entities exclusive rights to use that frequency band or bands for a particular application, typically in exchange for a licensing fee. In contrast, unlicensed spectrum refers to, for example, a frequency band or bands for which a license has not been granted by the government agency such that it is not exclusively used by a particular entity or application, although unlicensed spectrum is typically regulated by regional regulatory bodies.

From an end-user perspective, if the UE remains passive when LBT (or any other coexistence mechanism) fails, this degrades the user experience and perceived service quality by introducing delay into its uplink transmissions. Hence, there is a need for method and apparatus for handling such cases in a UE in order to avoid delay in performing the UL transmission, while at the same time taking advantage of the opportunities which come with aspects of tight integration, like dual connectivity to LTE and NR and having access to both licensed and unlicensed spectrum.

According to embodiments described herein, the UE makes an active decision on its own to select on which RAT (or frequency band) to perform uplink transmissions. By enabling the UE to autonomously make this decision, rather than the network, delays associated with things like coexistence mechanisms can be reduced or even avoided entirely. In this regard consider an alternative to enabling the UE to autonomously select the uplink transmission resource, e.g., to instead configure the UE to report environment conditions to the network, e.g., by reporting LBT delays to the network, so that the network could then further inform the UE which uplink resource to use for its transmissions. However, this signaling between the UE and the network might create yet additional delays, and might not even be effective in selecting the best uplink resource since the channel dynamics might not be captured by late network decisions, which may likely occur in very high frequencies.

Figure 3:
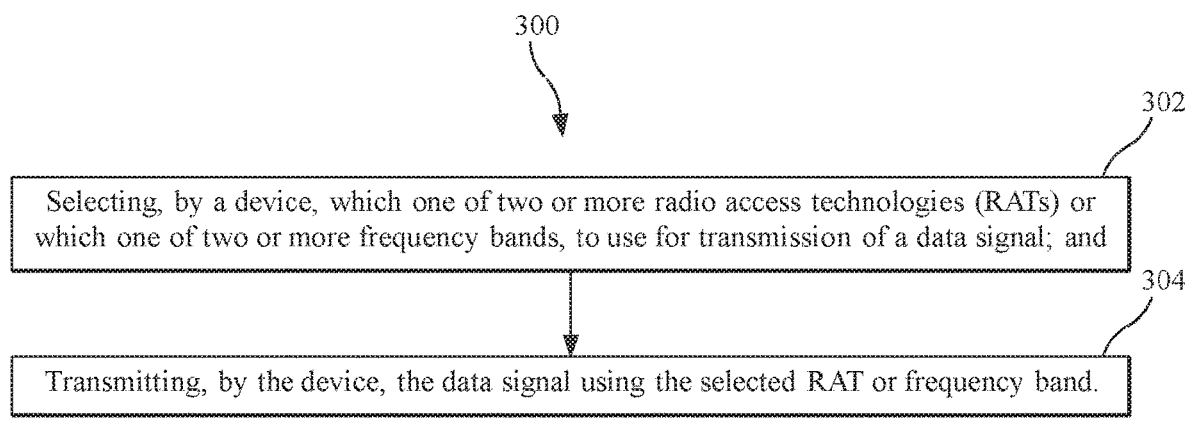
FIG. 3 is a flowchart depicting a method according to an embodiment.

A general method embodiment 300 is illustrated in the flowchart of FIG. 3. Therein, at step 302 a device selects which one of two or more radio access technologies (RATs) or, which one of two or more frequency bands, to use for transmission of a data signal and then transmits the data signal using the selected RAT or frequency band at step 304. In this context, although many of the embodiments discussed herein are described with respect to the UE autonomously selecting between a plurality of RATs for its data transmission, the selection could also be between a plurality of frequency bands, e.g., in the context of radio resources being available based upon carrier aggregation of different bands. This aspect is discussed in more detail below. Thus all embodiments described herein with respect to selecting, by a UE, among a plurality of RATs for data transmission are equally applicable to selecting, by a UE, among a plurality of frequency bands (and vice versa).

Additionally, from the method of FIG. 3, it will be noted that the selection of radio resources for transmission of a data signal by a device in accordance with these embodiments is not limited to uplink data signals, i.e., data signals from a UE toward a base station or eNB. For example, embodiments can also be applied to the selection of radio resources for so-called sidelink transmissions, i.e., from a UE toward another UE, which sidelink transmissions are expected to be supported in the coming 5G radio technology. Thus all embodiments described herein with respect to transmissions by a UE on an uplink are equally applicable to transmissions by a UE on a sidelink (and vice versa). Even more generally, the device specified in the method 300 of FIG. 3 can include devices other than UEs, e.g., smart sensors that need to upload data to an IoT system or other machine-type communications.

From this general embodiment of FIG. 3, more specific embodiments described below will illustrate these and other aspects. For example there may be one or more criteria that the UE considers in making its decision about which RAT or frequency band to use for the transmission of its data. An example of an active or autonomous uplink (or sidelink) resource decision may be that the UE, after being granted UL resources from more than one RAT, decides on the feasibility of transmitting on these RATs as well as any unlicensed RAT(s) on which the UE may be capable of transmitting its data. This decision may be based on various criteria, e.g., on the result of the performed LBT mechanism in the different frequency band(s) or RAT(s) (where relevant, i.e. in the unlicensed ones), interference estimation in the different frequency band(s) or RAT(s), and/or may also take into consideration a pre-defined prioritization among the different RATs. In addition, this decision about which radio resource to utilize for data transmission may be taken with different periodicity, e.g., each time the UE has to perform an uplink transmission, periodically or only for delay critical transmissions.

In one embodiment, the selection of the RAT may be based on the result of the performed LBT mechanism, or any other coexistence mechanism, in the different frequency bands/channels (where relevant, i.e, in the unlicensed one(s)). For instance, if a UE has the possibility to connect to a number 'x' of RATs operating in a number 'x' of frequency bands/channels (say 'x' is equal to 2, one licensed and the other unlicensed), the UE upon performing LBT, in the unlicensed frequency band/channel, may decide to perform an UL transmission on the RAT that is operating in the unlicensed band in case LBT was successful. In case LBT fails, regardless of the reason (i.e. whether it is due to a false detection or due to that the channel is occupied), the UE may decide to connect to the RAT that is operating in the licensed band instead. Note that, in this example, both the RAT in the licensed and unlicensed spectrum may be the same RAT but operating in different modes, e.g. LTE and also NR support operation in both licensed and unlicensed bands and so a UE may, e.g., be choosing between LTE in licensed spectrum and LTE operating in unlicensed spectrum, or they may be different RATs entirely, e.g., LTE and NR.

Figure 4:
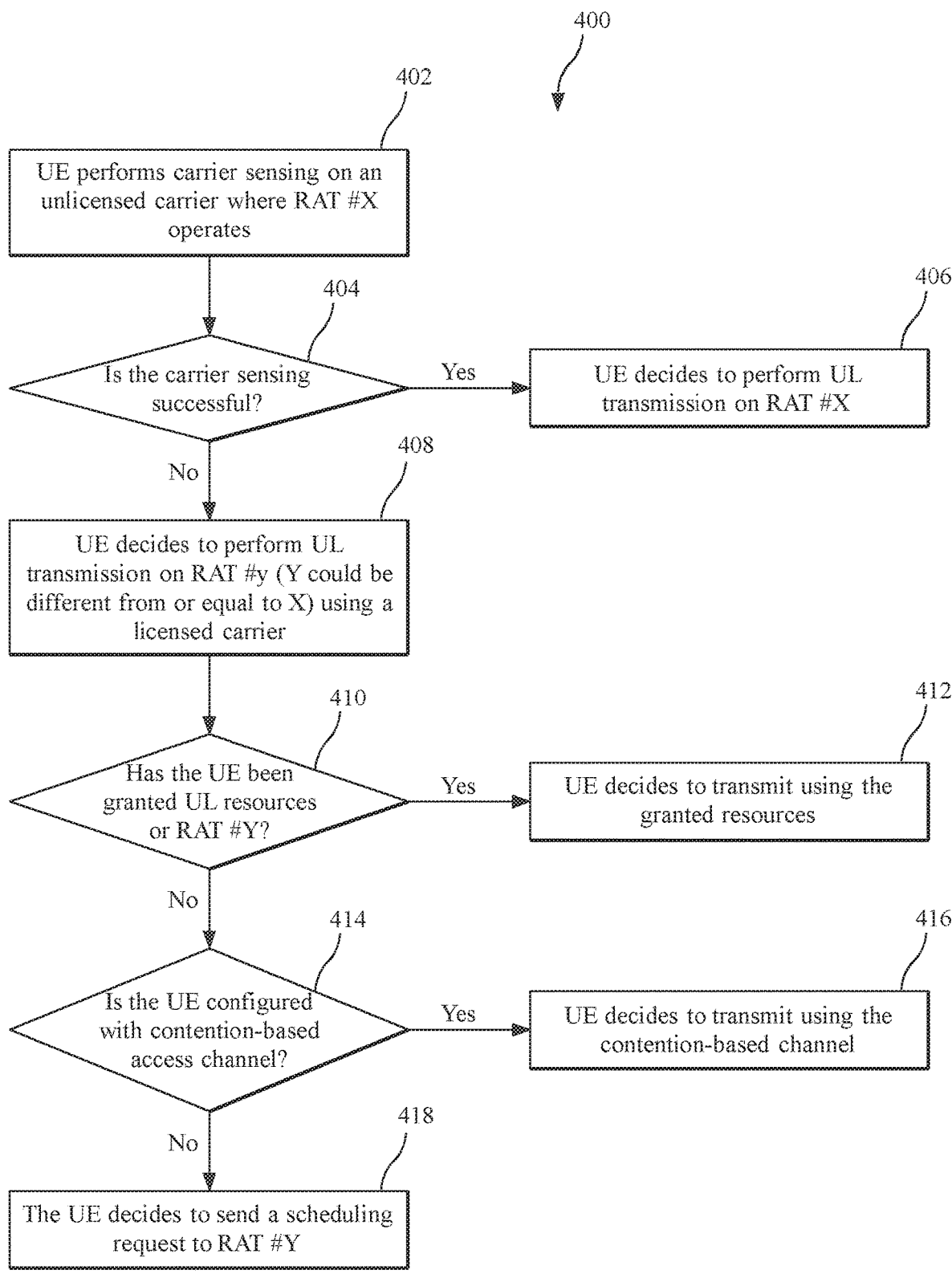
FIG. 4 is a flowchart depicting a method according to another embodiment.

An example of an embodiment similar to that described above is illustrated in the method 400 described by the flowchart in FIG. 4. Therein, at step 402, the UE performs carrier sensing (also referred to herein as LBT) on an unlicensed carrier where a certain RAT (e.g., RAT #X) operates. If the carrier sensing is successful at step 404, then the UE decides to perform its uplink transmission on RAT X. Alternatively, if carrier sensing fails at step 404, then the UE decides to transmit on a licensed carrier using another RAT (e.g., RAT #Y, step 408) if the UE has been granted resources (steps 410 and 412).

Note that even a RAT operating in licensed spectrum may provide contention-based access; such a scheme is foreseen to be standardized for NR. Even if a UE does not have a grant for exclusive/dedicated resources for the RAT operating in the licensed band, it still can access this RAT using contention based access (assuming the UE is configured to use the contention based access channel).

Thus, the embodiment of FIG. 4 also illustrates the possibility for contention-based access. At step 414, if the UE has not been granted UL resources on RAT Y, but has been configure to access RAT Y via a contention-based access channel (e.g., a random access channel), then the UE can decide to use the contention-based channel of RAT Y to transmit its data (step 416). Although not illustrated in FIG. 4, even though this contention-based access would occur in a licensed band, using the contention based access may also require some clear channel assessment prior to usage. This clear channel assessment could be LBT or it could be some other co-existence mechanism. Since this clear channel assessment is done in a licensed band (as opposed to the carrier sensing being performed in step 402) the kind of RATs operating in this band are known and potentially other co-existence schemes which are more efficient than LBT can be implemented for clear channel assessment of the contention-based channel. This clear channel assessment scheme may also allow different priorities depending on the cause.

If the UE has neither been granted resources nor contention-based access, it may decide to send a scheduling request to RAT Y operating in the licensed band as shown by step 418.

Figure 5:
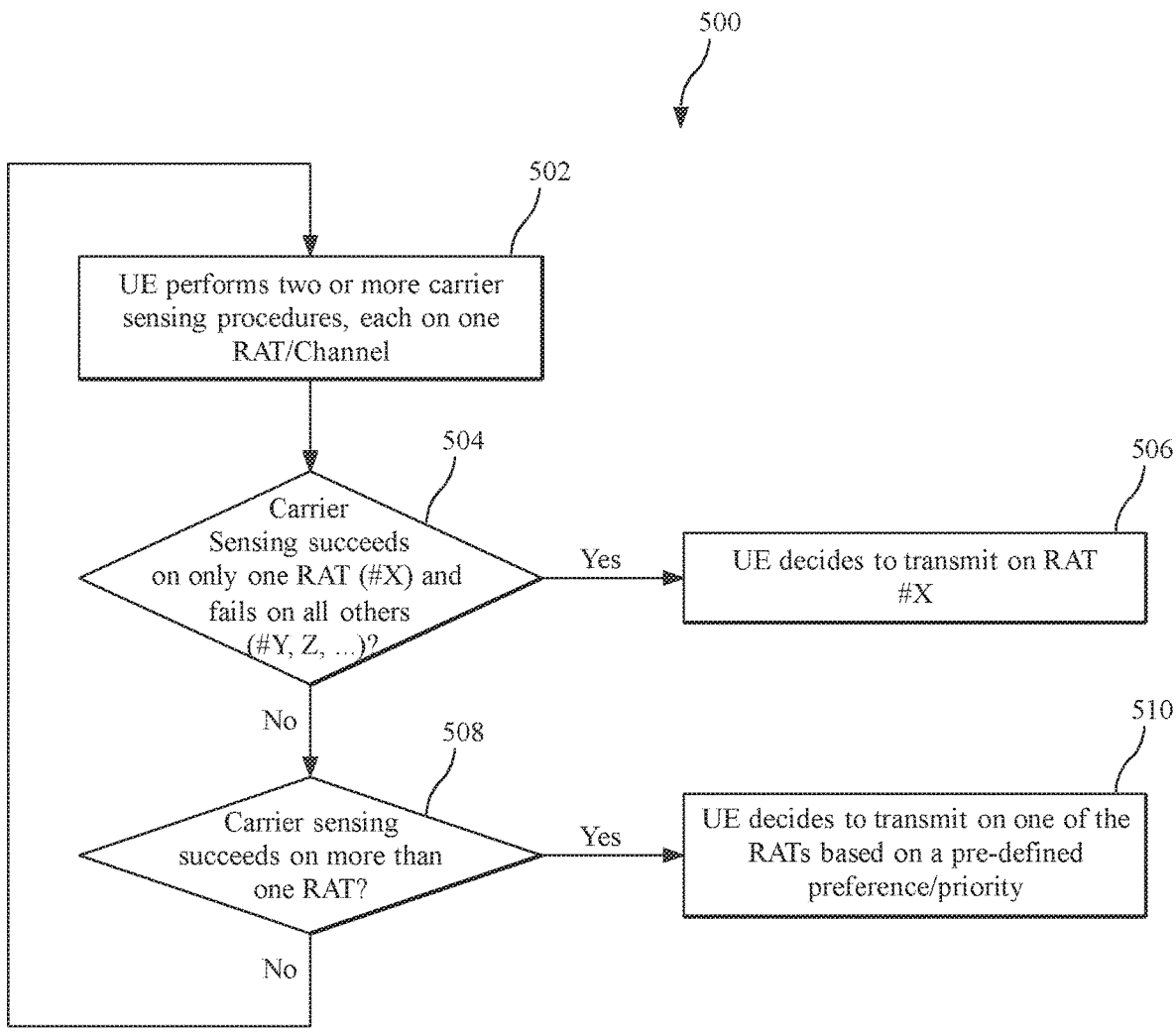
FIG. 5 is a flowchart depicting a method according to yet another embodiment.

The foregoing embodiment describes a UE which has the capability to transmit on two different RATs (one licensed, one unlicensed) to which it also currently has radio coverage from both of the networks. In another embodiment, both (or all) RATs may be operating in unlicensed bands. In this case, the UE may simultaneously initiate two LBT mechanisms (each on one RAT/channel), however with independent back-off counters that could be controlled by the UE based on the preference of using a certain RAT/band. This embodiment is illustrated by method 500 in the flowchart of FIG. 5. Therein, the UE performs two or more carrier sensing procedures on each unlicensed RAT on which it is possible for the UE to transmit data at step 502. If the carrier sensing succeeds on only one of the RATs, and fails on the others, at step 504, then the UE can decide to transmit on the RAT which it perceives to be clear for transmission (e.g., RAT #X, step 506). Otherwise, if the carrier sensing is successful on more than one of the plurality of unlicensed RATs at step 508, then the UE will need to apply some additional criteria beyond just the clear channel assessment to select a RAT for its data transmission. In the embodiment of FIG. 5, this other criteria is a pre-defined preference or priority which has been assigned to the various RATs and stored in the UE (as shown by step 510). However, according to other embodiments, the secondary selection criteria could be something else, e.g., previous success history of each RAT, interference estimation, etc.

As shown in FIG. 5, if none of the RATs being evaluated by the UE are determined to have a clear channel for transmission as a result of the carrier sensing process, then the UE can return to step 502 to evaluate the RATs once again (e.g., after the back-off timer has expired for each RAT) to start the selection process again. Alternatively, if the UE also is capable of transmitting on one or more RATs using licensed spectrum, the flow from block 508 could continue into a decision path associated with selecting a licensed RAT for transmission, e.g., like steps 408-418 in FIG. 4.

In making its autonomous decision regarding which RAT to use for uplink or sidelink transmissions, the UE can also consider its current status with regard to existing uplink resource grants and how that might affect overall delay in its uplink transmissions. For example, in some embodiments, the UL grant to the UE in the licensed band may include a smaller uplink transmission resource than in the unlicensed band and, in that case, the UE can prioritize which data to start transmitting if it selects the licensed band for uplink transmissions. For instance, control (RRC) or buffer status report (BSR) (or other time-critical data) may have higher priority than other (non-time-critical/best effort) data packets; and may therefore be transmitted in the allocated UL. In another case a UE may not have any granted uplink resources when it recognizes data needs to be transmitted but instead it might have only a scheduling request resource in the RAT operating in the licensed band. In this case, depending on the latency between sending an SR request and actually receiving an UL grant of resources and the time until the grant is valid, the UE may still decide that it is beneficial to send a scheduling request to use the licensed band rather than using the unlicensed band to which it also has access.

Those skilled in the art will appreciate that numerous other permutations are considered in these embodiments, e.g., different ways in which a UE may select a RAT or frequency band. For example, In another embodiment, the selection of the RAT may be based on the interference or channel estimation in the different band which are available to the UE. This embodiment is particularly relevant in networks with dynamic, short-term interference sources, e.g. terminals transmitting and receiving bursty, short-package data traffic. The UE may have obtained grants for UL transmission, or is otherwise permitted to transmit, in multiple RATs, one of them the default or preferred RAT. However, if the UE determines that the interference status of the preferred RAT has suddenly worsened and efficient data transmission is not possible, then the UE may then decide on another RAT to perform the transmission.

In another embodiment, the UE maintains and stores its own local statistics of success rates for different access options (e.g., RAT type, carrier frequency, etc). If the preferred access RAT is not available due to unsuccessful LBT, then the stored transmission success rates for the other RAT alternatives can be evaluated by the UE evaluated to choose an alternative RAT and/or frequency band for its uplink or sidelink transmission. The stored transmission success rate for a given RAT or frequency band can be updated locally by the UE after successful or failed transmissions. Evaluation of successful or failed transmission can be based on one or more of packet acknowledgement, packet acknowledgement within a certain latency, etc. By using transmission success rate as prioritization mechanisms many network fault behaviors (or unwanted properties) can be handled without creating a large impact on the service experienced by the device, e.g., slow network, network with lost internet connection, overloaded network.

Yet another criteria which could be considered by a UE in its autonomous selection of a RAT or frequency band according to an embodiment are characteristics of the licensed and unlicensed carriers which are configured to the UE. For example, the configured unlicensed carriers could be deployed in much lower frequencies than the licensed carriers, e.g., of the same or another RAT, such as NR. Therefore, the UE could have a higher chance of losing synchronization and/or having an abrupt drop of SINR if it uses the licensed carrier band for its data transmission. These very dynamic SINR changes and/or signal quality could be used as criteria for selecting a RAT or frequency band so that the UE can transmit UL data and/or messages over unlicensed bands.

Note that in any of these embodiments the number of RATs (or frequency bands) may not be limited to two; in such a case, the UE may, for example, exclude the RAT(s) where LBT fails and select between all other RATs which are feasible for this transmission, which may be RATs where the UE currently has a valid UL grant or a contention-based grant, RATs based on a pre-defined priority order or based on different possible factors, e.g. the RAT with best radio channel characteristics, lowest latency (for instance, the RAT having shortest delay to next valid UL grant), highest reliability, lowest load, highest peak rate, largest granted resources or any other factors, dedicated vs. contention resource.

Note that although embodiments described herein contemplate that the UE will autonomously select a RAT or frequency band for transmission of its uplink or sidelink data, such autonomy does not preclude the network's involvement in the process at all, but instead contemplates a situation in which the UE can make a selection without signaling between the UE and the network to indicate the network's permission of a particular choice made by the UE for its transmission. Thus, according to other embodiments the UE can be configured by the network to determine how it will autonomously use the UE-based selection/switching features that have been described herein. This is especially important considering the opportunities the future networks will have to configure the UE in different forms of UL multi-connectivity. In that case, which likely to occur for the Next Generation RAN (which includes both NR and LTE), each RAT itself has some form of unlicensed operation where features like UL carrier aggregation (CA) and/or dual connectivity (DC) could be applied. Therefore, there could be scenarios where the UE is configured with a licensed channel and an unlicensed channel in the UL where these are either from the same RAT or from different RATs. Configuration could occur via RRC signaling from the network to the UE, e.g. based on UE capabilities and network condition (such as load in the different bands). Some example of configurations include the following:

CA or DC with LTE licensed band/channel and LTE unlicensed band/channel

CA or DC with NR licensed band/channel and NR unlicensed band/channel

CA or DC with LTE licensed band/channel and NR unlicensed band/channel

CA or DC with NR licensed band/channel and LTE unlicensed band/channel

For example, the UE can be configured by the network to trans over LTE PUSCH and an unlicensed channel to be defined in NR. These resources can either be provide as some form of carrier aggregation with two carriers from different RATs or dual connectivity, where one link is comprised by a licensed carrier while the other is comprised by an unlicensed carrier. In more general terms, instead of using a channel in unlicensed spectrum the UE could be using a channel in a common channel in a licensed spectrum as long as the channel access rely on some form of LBT mechanism that could delay the transmission of UL messages/data. This could also be applied for example in the case of WLAN/LTE or WLAN/NR UL aggregation.

Other permutations in the embodiments can be seen in terms of the periodicity with which the UE makes a RAT or frequency band selection. In one embodiment, this action/decision may be taken by the UE each time it has to perform an UL transmission. In another embodiment, this action may be periodically done by the UE or on an as needed basis. A non-limiting example of this latter embodiment may be that a UE performs this action after trying to access the unlicensed channel for some time, i.e. after performing a pre-defined number of LBT procedures. In another example, the UE may perform this action periodically for every nth UL transmission, where 'n' may be a pre-defined fixed number, dynamically chosen/updated or configured via a parameter sent from the network. In yet another embodiment, this action may be performed by the UE only for specific transmissions. In a non-limiting example, these specific transmissions may be of delay critical type.

Even though the embodiments have been discussed primarily in the context of UL in a cellular network, they are also applicable to sidelinks, i.e. links between devices or between network nodes. For example, a UE may try to initiate a sidelink transmission in unlicensed spectrum but clear channel assessment fails and it falls back to another RAT/transmission mode in licensed spectrum as described above.

Although primarily affecting UEs, there may also be certain network implications associated with implementing embodiments discussed herein where the UE is enable to autonomously select a RAT or frequency band for uplink transmissions. For example, if a base station/eNB has transmitted data to a UE over licensed spectrum for which it is awaiting acknowledgement of receipt over that licensed spectrum, should the UE instead autonomously decide to transmit that acknowledgement (implicitly or explicitly) on unlicensed spectrum it may be desirable for the network to be able to recognize this in a manner which enables it to avoid unnecessary retransmission of that data and to deallocate the granted resource. Thus according to another embodiment, a network node includes a transceiver for transmitting signals toward, and receiving signals from, user equipment over one or more air interfaces including two or more Radio Access Technologies (RATs) or two or more frequency bands; and a processor for processing a signal received from the user equipment over a first RAT or a first frequency band and for determining whether the signal either implicitly or explicitly confirms an uplink resource grant which had previously been transmitted to the user equipment on a second RAT or second frequency band. In this context, the network node may be able to implicitly determine from the UE's signal received on the first RAT that it received the grant on the second RAT, so as to then avoid retransmission and to deallocate the granted resources. Alternatively, according to another embodiment, the UE may explicitly confirm receipt of the grant via an information element or field in its transmitted signal on the second RAT. Such network node components are described and illustrated below with respect to FIG. 6.

Thus far embodiments have focused on methods associated with selecting a RAT or frequency band by a UE for uplink or sidelink transmission, however other embodiments relate to devices, e.g., UEs and network nodes, e.g., base stations or eNBs, within which such methods can be implanted. Thus, according to some embodiments, the various functions described above can be performed by apparatus which include a module for performing each function.

Figure 6:
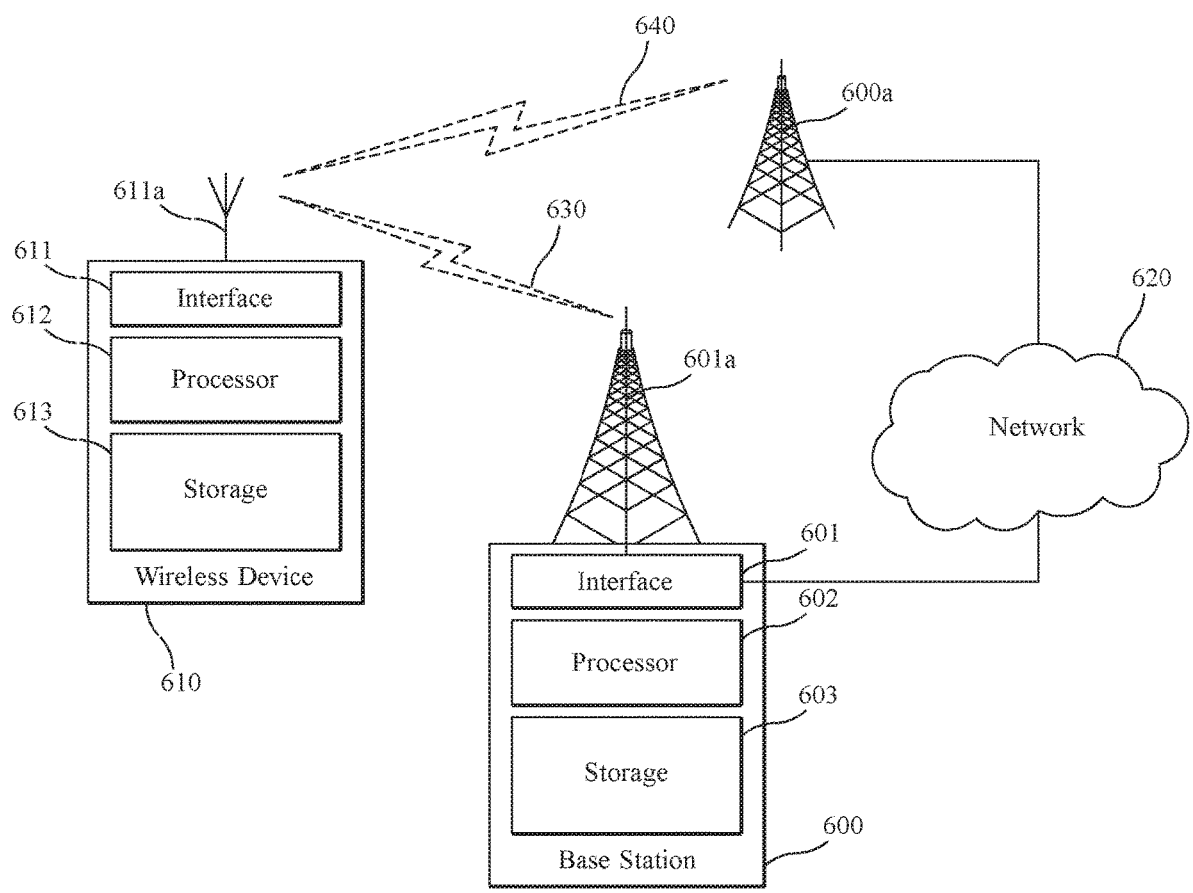
FIG. 6 depicts elements of a radiocommunication system.

As another example of structural embodiments, FIG. 6 illustrates a wireless network comprising a more detailed view of network node 600 and wireless device (WD) 610, in accordance with an embodiment. For simplicity, FIG. 6 only depicts network 660, network nodes 600 and 600*a*, and WD 610, i.e., a UE. Network node 600 comprises processor 602, storage 603, interface 601, and antenna 601*a*. Similarly, WD 610 comprises processor 612, storage 613, interface 611 and antenna 611*a*. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

Network 620 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Figure 1B:
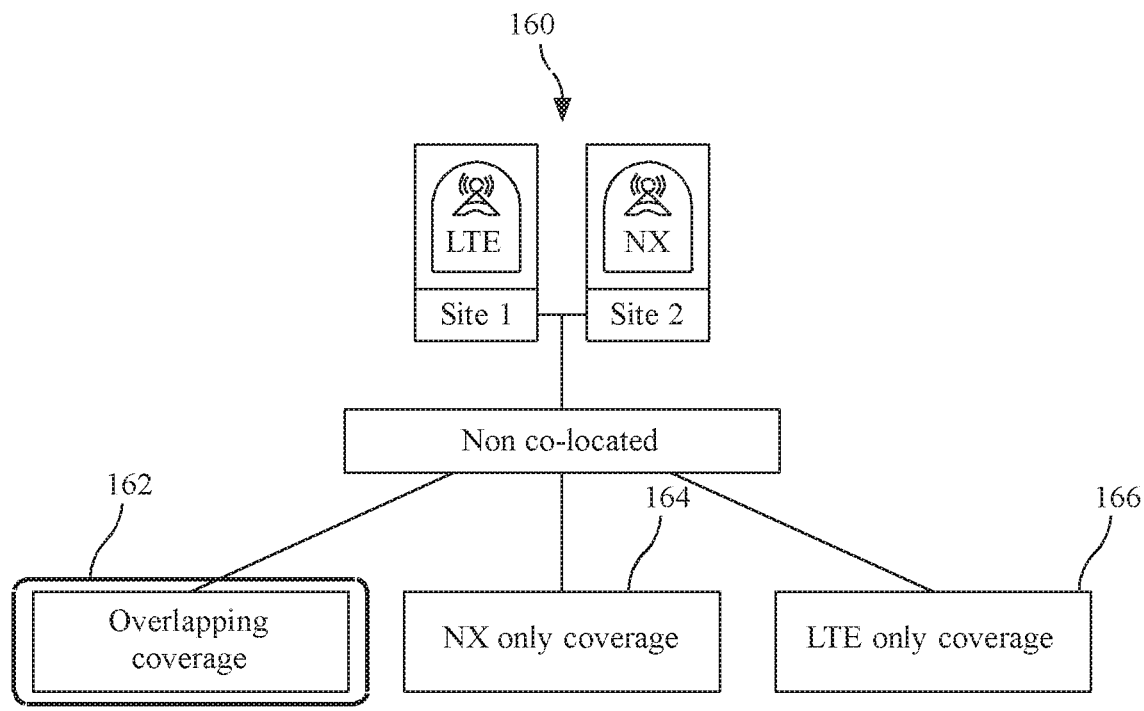
Figure 2A:
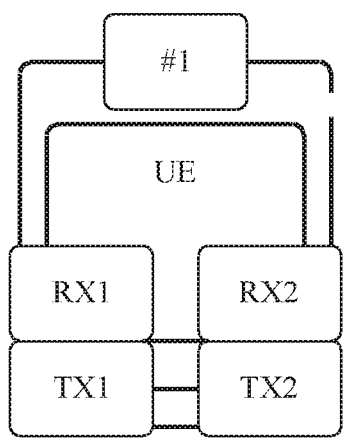
FIG. 2 illustrates various UE scenarios associated with deployment of 5G radiocommunication systems.
Figure 2B:
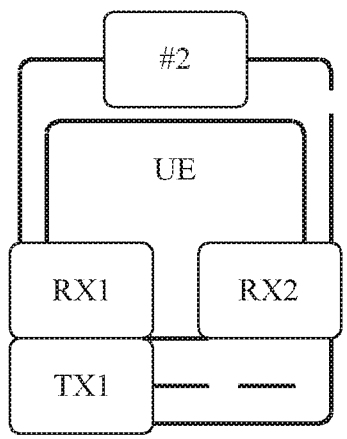
Figure 2C:
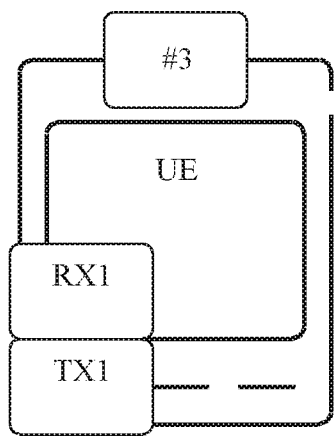

Network node 600 comprises processor 606, storage 603, interface 601, and antenna 601*a*. These components are depicted as single boxes located within a single larger box. In practice however, a network node may comprises multiple different physical components that make up a single illustrated component (e.g., interface 601 may comprise terminals for coupling wires for a wired connection and a radio transceiver for a wireless connection). As another example, network node 600 may be a virtual network node in which multiple different physically separate components interact to provide the functionality of network node 600 (e.g., processor 602 may comprise three separate processors located in three separate enclosures, where each processor is responsible for a different function for a particular instance of network node 600). Similarly, network node 600 may be composed of multiple physically separate components (e.g., a NodeB component and a RNC component, a BTS component and a BSC component, etc.), which may each have their own respective processor, storage, and interface components. In certain scenarios in which network node 600 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 600 may be configured to support multiple radio access technologies (RATs), e.g., as described earlier with respect to FIG. 1(a) or 1(b). In such embodiments, some components may be duplicated (e.g., separate storage 603 for the different RATs) and some components may be reused (e.g., the same antenna 601a may be shared by the RATs).

Processor 602 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 600 components, such as storage 603, network node 600 functionality. For example, processor 602 may execute instructions stored in storage 603. Such functionality may include providing various wireless features discussed herein to a wireless devices, such as WD 610, including any of the features or benefits disclosed herein.

Storage 603 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 603 may store any suitable instructions, data or information, including software and encoded logic, utilized by network node 600. Storage 603 may be used to store any calculations made by processor 602 and/or any data received via interface 601.

Network node 600 also comprises interface 601 which may be used in the wired or wireless communication of signalling and/or data between network node 600, network 620, and/or WD 610. For example, interface 601 may perform any formatting, coding, or translating that may be needed to allow network node 600 to send and receive data from network 620 over a wired connection. Interface 601 may also include a radio transmitter and/or receiver that may be coupled to or a part of antenna 601a. The radio may receive digital data that is to be sent out to other network nodes or WDs via a wireless connection. The radio may convert the digital data into a radio signal having the appropriate channel and bandwidth parameters. The radio signal may then be transmitted via antenna 601a to the appropriate recipient (e.g., WD 610).

Antenna 601a may be any type of antenna capable of transmitting and receiving data and/or signals wirelessly. In some embodiments, antenna 601a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

WD 610 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 600 and/or other WDs via uplink signals or sidelink signals, respectively. WD 610 comprises processor 612, storage 613, interface 611, and antenna 611a. Like network node 600, the components of WD 610 are depicted as single boxes located within a single larger box, however in practice a wireless device may comprises multiple different physical components that make up a single illustrated component (e.g., storage 613 may comprise multiple discrete microchips, each microchip representing a portion of the total storage capacity).

Processor 612 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 610 components, such as storage 613, WD 610 functionality. Such functionality may include providing various wireless features discussed herein, including any of the features or benefits disclosed herein.

Storage 613 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 613 may store any suitable data, instructions, or information, including software and encoded logic, utilized by WD 610. Storage 613 may be used to store any calculations made by processor 612 and/or any data received via interface 611.

Interface 611 may be used in the wireless communication of signalling and/or data between WD 610 and network node 600. For example, interface 611 may perform any formatting, coding, or translating that may be needed to allow WD 610 to send and receive data from network node 600 over a wireless connection. Interface 611 may also include a radio transmitter and/or receiver that may be coupled to or a part of antenna 611a. The radio may receive digital data that is to be sent out to network node 601 via a wireless connection. The radio may convert the digital data into a radio signal having the appropriate channel and bandwidth parameters. The radio signal may then be transmitted via antenna 611a to network node 600.

Antenna 611a may be any type of antenna capable of transmitting and receiving data and/or signals wirelessly. In some embodiments, antenna 611a may comprise one or more omni-directional, sector or panel antennas operable to transmit/receive radio signals between 2 GHz and 66 GHz. For simplicity, antenna 611a may be considered a part of interface 611 to the extent that a wireless signal is being used.

Any steps described herein are merely illustrative of certain embodiments. It is not required that all embodiments incorporate all the steps disclosed nor that the steps be performed in the exact order depicted or described herein. Furthermore, some embodiments may include steps not illustrated or described herein, including steps inherent to one or more of the steps disclosed herein.

Any appropriate steps, methods, or functions may be performed through a computer program product that may, for example, be executed by the components and equipment illustrated in the figure above. For example, storage 603 may comprise computer readable means on which a computer program can be stored. The computer program may include instructions which cause processor 602 (and any operatively coupled entities and devices, such as interface 601 and storage 603) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 612 and/or 602, possibly in cooperation with storage 613 and/or 603. Processors 612 and/or 602 and storage 613 and/or 603 may thus be arranged to allow processors 612 and/or 602 to fetch instructions from storage 613 and/or 603 and execute the fetched instructions to allow the respective functional module to perform any steps or functions disclosed herein.

On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

As also will be appreciated by one skilled in the art, the embodiments may take the form of an entirely hardware embodiment or an embodiment combining hardware and software aspects. Further, the embodiments can be implemented using a computer program product stored on a computer-readable storage medium having computer-readable instructions embodied in the medium. Any suitable computer-readable medium may be utilized, including RAM, hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method for selecting, by a device, a carrier in a telecommunication system having two or more radio access technologies (RATs), the method comprising:
performing, by the device, carrier sensing on one or more unlicensed carriers, each unlicensed carrier associated with one of the two or more RATs;
determining, by the device, whether at least one unlicensed carrier of the one or more unlicensed carriers is clear;
responsive to determining that the at least one unlicensed carrier is clear:
selecting, by the device, one of the one or more unlicensed carriers based on a highest priority RAT of the two or more RATs; and
transmitting, by the device, on the selected unlicensed carrier; and
responsive to determining that none of the one or more unlicensed carriers is clear, transmitting, by the device, on a licensed carrier, wherein transmitting on the licensed carrier comprises:
determining whether the device is granted uplink resources on the licensed carrier;
responsive to determining that the device is granted the uplink resources on the licensed carrier, transmitting on the granted uplink resources;
responsive to determining that the device is not granted the uplink resources on the licensed carrier and a contention-based channel is available, transmitting on the available contention-based channel; and
responsive to determining that the device is not granted the uplink resources on the licensed carrier and the contention-based channel is not available:
sending a scheduling request to at least one of the two or more RATs;
receiving a requested uplink grant indicating requested uplink resources for the licensed carrier; and
transmitting on the requested uplink resources indicated by the requested uplink grant.

2. The method of claim 1,
wherein transmitting on the licensed carrier comprises:
determining whether the contention-based channel on a licensed carrier associated with the two or more RATs is available.

3. The method of claim 1,
wherein selecting the one of the one or more unlicensed carriers comprises assigning, by the device for each of the two or more RATs, a respective pre-defined priority.

4. The method of claim 3,
wherein selecting the one of the one or more unlicensed carriers further comprises:
storing the assigned pre-defined priorities for each of the two or more RATs in the device; and
selecting, by the device, the one of the one or more unlicensed carriers based on the highest priority RAT among the stored pre-defined priorities of the two or more RATs.

5. The method of claim 1,
wherein the method is performed either for each data transmission or periodically.

6. The method of claim 1,
wherein the method is performed for delay critical transmissions.

7. The method of claim 1,
wherein the device selects the carrier in the telecommunication system having the two or more RATs autonomously without permission from a network to which data is being transmitted.

8. A device comprising:
processing circuitry configured to:
perform, by the device, carrier sensing on one or more unlicensed carriers, each unlicensed carrier associated with one of two or more radio access technologies (RATS);
determine whether at least one unlicensed carrier is clear;
responsive to a determination that the at least one unlicensed carrier of the one or more unlicensed carriers is clear:
select one of the one or more unlicensed carriers, based on a highest priority RAT of the two or more RATs; and
transmit on the selected unlicensed carrier; and
responsive to a determination that none of the one or more unlicensed carriers is clear, transmit on a licensed carrier, wherein to transmit on the licensed carrier, the processing circuitry is configured to:

determine whether the device is granted uplink resources on the licensed carrier;

responsive to a determination that the device is granted the uplink resources on the licensed carrier, transmit on the granted uplink resources;

responsive to a determination that the device is not granted the uplink resources and a contention-based channel is available, transmit on the available contention-based channel; and responsive to a determination that the device is not granted the uplink resources and the contention-based channel is not available:
- send a scheduling request to at least one of the two or more RATs, receive a requested uplink grant indicating requested uplink resources for the licensed carrier, and
- transmit on the requested uplink resources indicated by the requested uplink grant.

9. The device of claim 8,
wherein to transmit on the licensed carrier, the processing circuitry is configured to:
determine whether the contention-based channel on a licensed carrier associated with the two or more RATs is available.

10. The device of claim 8,
wherein to select the one of the one or more unlicensed carriers, the processing circuitry is configured to:
assign, for each of the two or more RATs, a respective pre-defined priority.

11. The device of claim 10,
wherein to select the one of the one or more unlicensed carriers, the processing circuitry is further configured to:
store the assigned pre-defined priorities for each of the two or more RATs in the device; and
select the one of the one or more unlicensed carriers based on the highest priority RAT among the stored pre-defined priorities of the two or more RATs.

12. A non-transitory computer readable recording medium storing a computer program product for selecting, by a device, a carrier in a telecommunications system having two or more radio access technologies (RATs), the computer program product comprising software instructions which, when run on processing circuitry of the device, cause the device to:

perform, by the device, carrier sensing on one or more unlicensed carriers, each unlicensed carrier associated with one of the two or more RATs;

determine whether at least one unlicensed carrier is clear;

responsive to a determination that the at least one unlicensed carrier of the one or more unlicensed carriers is clear:
- select one of the one or more unlicensed carriers based on a highest priority RAT of the two or more RAT; and
- transmit on the selected unlicensed carrier; and responsive to a determination that none of the one or more unlicensed carriers is clear, transmit on a licensed carrier, wherein to transmit on the licensed carrier, the software instructions which, when run on the processing circuitry of the device, cause the device to:

determine whether the device is granted uplink resources on the licensed carrier;

responsive to a determination that the device is granted the uplink resources, transmit on the granted uplink resources;

responsive to a determination that the device is not granted the uplink resources and a contention-based channel is available, transmit on the available contention-based channel; and responsive to a determination that the device is not granted the uplink resources and the contention-based channel is not available:
- send a scheduling request to at least one of the two or more RATs,
- receive a requested uplink grant indicating requested uplink resources for the licensed carrier, and
- transmit on the requested uplink resources indicated by the requested uplink grant.

13. The non-transitory computer readable recording medium of claim 12,
wherein to transmit on the licensed carrier, the software instructions which, when run on the processing circuitry of the device, cause the device to:
determine whether the contention-based channel on a licensed carrier associated with the two or more RATs is available.

14. The non-transitory computer readable recording medium of claim 12,
wherein to select one of the one or more unlicensed carriers, the software instructions which, when run on the processing circuitry of the device, cause the device to:
assign, for each of the two or more RATs, a respective pre-defined priority.

15. The non-transitory computer readable recording medium of claim 14,
wherein to select one of the one or more unlicensed carriers, the software instructions which, when run on the processing circuitry of the device, further cause the device to:
store the assigned pre-defined priorities for each of the two or more RATs in the device; and
select the one of the one or more unlicensed carriers based on the highest priority RAT among the stored pre-defined priorities of the two or more RATs.

* * * * *